(12) United States Patent
Kashima et al.

(10) Patent No.: US 9,094,279 B2
(45) Date of Patent: Jul. 28, 2015

(54) COMMUNICATION APPARATUS FOR TRANSMISSION OF BINARY CODED SIGNAL

(71) Applicants: DENSO CORPORATION, Kariya, Aichi-pref. (JP); ANDEN CO., LTD., Anjo, Aichi-pref. (JP)

(72) Inventors: Hideki Kashima, Kariya (JP); Tomohisa Kishigami, Obu (JP); Naoji Kaneko, Toyokawa (JP); Nobutomo Takagi, Okazaki (JP)

(73) Assignees: DENSO CORPORATION, Kariya (JP); ANDEN CO., LTD., Anjo (JP)

( * ) Notice: Subject to any disclaimer, the term of this patent is extended or adjusted under 35 U.S.C. 154(b) by 0 days.

(21) Appl. No.: 14/083,814

(22) Filed: Nov. 19, 2013

(65) Prior Publication Data

US 2014/0140390 A1 May 22, 2014

(30) Foreign Application Priority Data

Nov. 20, 2012 (JP) ................................. 2012-254584

(51) Int. Cl.
- *H03K 7/08* (2006.01)
- *H04L 25/49* (2006.01)
- *H04L 7/04* (2006.01)
- *H04L 7/06* (2006.01)

(52) U.S. Cl.
CPC ............ *H04L 25/4902* (2013.01); *H04L 7/041* (2013.01); *H04L 7/065* (2013.01)

(58) Field of Classification Search
USPC .................. 375/238, 371, 329; 345/102, 694
See application file for complete search history.

(56) References Cited

U.S. PATENT DOCUMENTS

| | | | | |
|---|---|---|---|---|
| 8,373,643 | B2 * | 2/2013 | Zhao et al. | 345/102 |
| 2003/0193514 | A1 * | 10/2003 | Huang | 345/694 |
| 2008/0042634 | A1 * | 2/2008 | Harrison et al. | 323/288 |
| 2008/0186948 | A1 * | 8/2008 | Ramaswamy et al. | 370/350 |
| 2009/0161808 | A1 * | 6/2009 | Cheong et al. | 375/371 |
| 2011/0193648 | A1 * | 8/2011 | Zhao | 332/109 |
| 2012/0250799 | A1 * | 10/2012 | Bhat et al. | 375/329 |

* cited by examiner

*Primary Examiner* — Eva Puente
(74) *Attorney, Agent, or Firm* — Posz Law Group, PLC

(57) ABSTRACT

A communication apparatus includes a detecting unit, a process performing unit, and a range setting unit. The detecting unit detects a boundary pattern periodically appearing between codes in a binary coded signal transmitted through a transmission line. The boundary pattern is information showing a boundary appearing between codes. The process performing unit performs a process in synchronization with timing of appearance of the boundary pattern. The range setting unit sets an allowance range which is set include timing at which it is estimated that the next boundary pattern appears. The timing is counted from the timing currently detected by the detecting unit. The detecting unit includes a section which detects the timing of appearance of the boundary pattern during the allowance range.

15 Claims, 7 Drawing Sheets

COMMUNICATION APPARATUS FOR TRANSMISSION OF BINARY CODED SIGNAL

CROSS-REFERENCE TO RELATED APPLICATION

This application is based on and claims the benefit of priority from earlier Japanese Patent Application No. 2012-254584 filed Nov. 20, 2012, the description of which is incorporated herein by reference.

BACKGROUND OF THE INVENTION

1. Technical Field of the Invention

The present invention relates to a commutation apparatus, and in particular, to a communication apparatus that performs various processes in synchronization with the timing of detecting a boundary pattern that periodically appears in a binary coded signal transmitted through a transmission line.

2. Related Art

It is well known that some communication systems installed in vehicles are configured to use pulse width modulation (PWM) codes as transmission line codes (e.g., see non-patent document SAE-J1850).

In general, when the PWM codes expressing two logical values are decoded, the logical values are determined on the basis of the signal level sampled after lapse of a predetermined period (that is the timing when a signal level differs from one another between the codes that correspond to the respective logical values) from a falling edge (periodically appearing boundary pattern) that expresses a boundary between bits, or on the basis of the results of the measurement of the length of a time duration from the bit boundary to a rising edge (low-level period).

However, these decoding methods have a problem that, if the instantaneously occurring change of signal level due to noises or the like is erroneously detected as a bit boundary, the decoding will result in an error and the communication quality will be impaired.

SUMMARY

Hence it is desired to provide a communication apparatus which is able to minimize the impact of noises to accurately perform processes in synchronization with the timing of detecting a boundary pattern.

In order to achieve the above object, a communication apparatus includes detecting unit for detecting a boundary pattern periodically appearing between codes in a binary coded signal transmitted through a transmission line, the boundary pattern being information showing a boundary appearing between codes; process performing unit for performing a process in synchronization with a timing of appearance of the boundary pattern detected by the detecting unit; and range setting unit for setting an allowance range which is set include timing at which it is estimated that the next boundary pattern appears, the timing being counted from the timing currently detected by the detecting unit. The detecting unit has the capacity to detect the timing of appearance of the boundary pattern during the allowance range set by the range setting unit.

The communication apparatus does not erroneously detect a pattern which is similar to the boundary pattern and has accidentally occurred outside the allowance range due to the impact of noise or the like. Therefore, the communication apparatus is able to accurately perform processings in synchronization with the timing of detecting a boundary pattern.

DETAILED DESCRIPTION OF THE PREFERRED EMBODIMENTS

With reference to the accompanying drawings shown in FIGS. 1-8, hereinafter is described an embodiment of the present invention.

<General Configuration>

Figure 1:
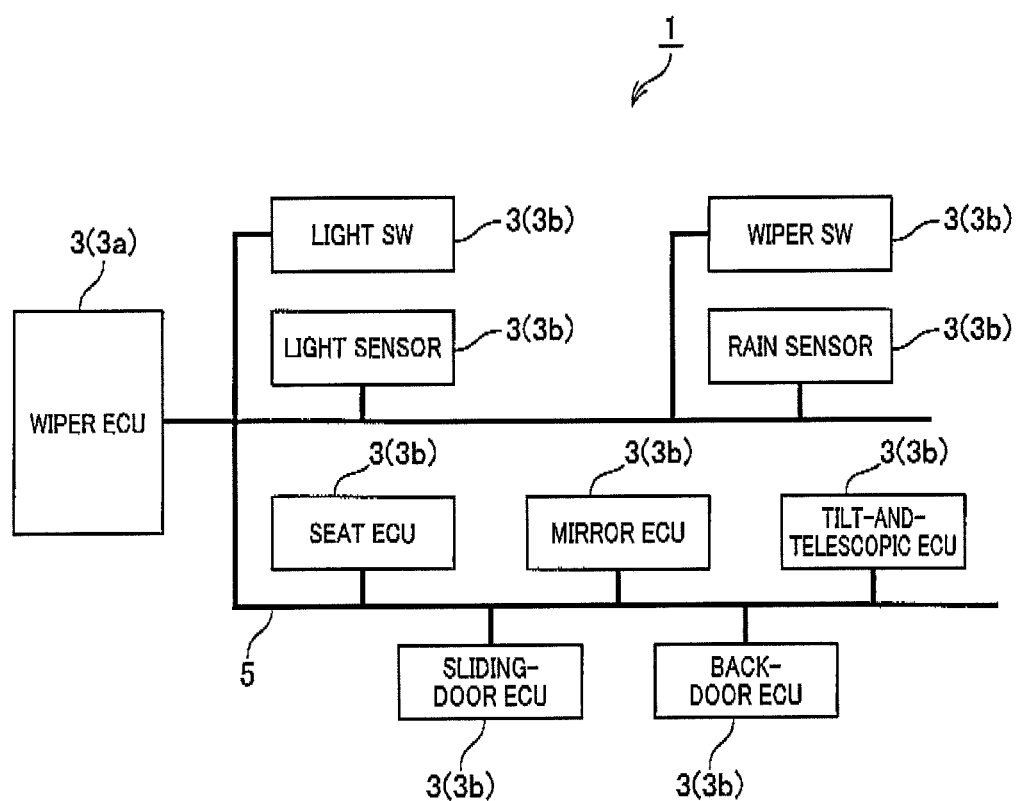
FIG. 1 is a schematic block diagram illustrating a configuration of an in-vehicle communication system, according to an embodiment of the present invention.

FIG. 1 is a schematic block diagram illustrating a configuration of an in-vehicle communication system (i.e., a communication apparatus) 1 to which the present invention is applied, according to the embodiment. As shown in FIG. 1, the in-vehicle communication system 1 includes nodes 3 which are connected to each other via a bus-like transmission line 5. The nodes 3 include electronic control units (body-system ECUs) that realize applications of a vehicle body system, and peripheral devices (lights, sensors, etc.) that detect or control the conditions of the vehicle.

Of the nodes 3, the body-system ECUs include a wiper ECU, seat ECU, sliding-door ECU, mirror ECU, backdoor ECU, light ECU and tilt-and-telescopic (electric steering position adjusting device) ECU. The peripheral devices include a light switch (SW), a wiper switch (SW), a light sensor and a rain sensor.

<Bus Communication Line>

The transmission line 5 is configured such that, when a high-level (first level) signal and a low-level (second level) signal are simultaneously outputted from different nodes 3, the signal level on the transmission line 5 turns to low. Making use of this function, bus arbitration is realized in the transmission line 5.

Figure 2A:
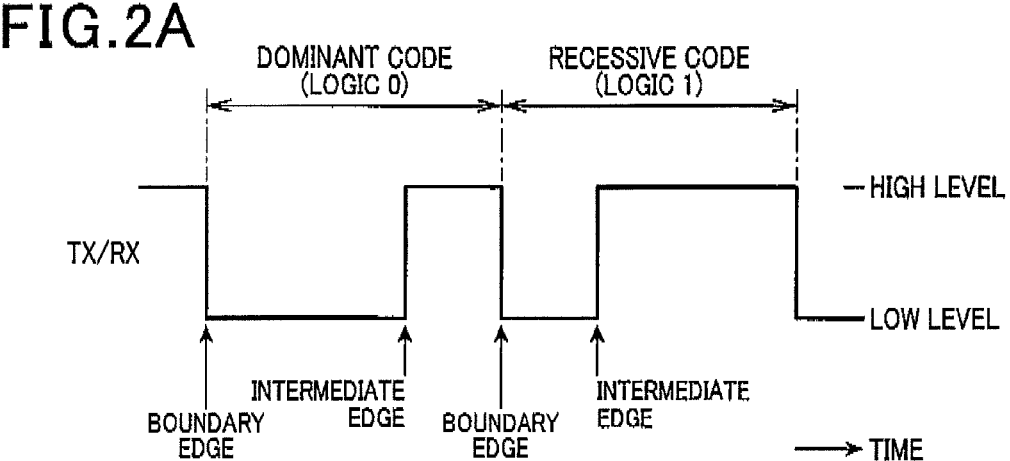
FIG. 2A is an explanatory diagram illustrating transmission codes used in communication performed via a transmission line, according to the embodiment.

FIG. 2A is an explanatory diagram illustrating transmission codes used in communication performed via the transmission line 5. As shown in FIG. 2A, the transmission line 5 uses PWM (pulse width modulation) codes as transmission codes. In the PWM codes, the signal level turns from high to low at a boundary between bits (bit boundary) and the signal level turns from low to high at some point in a bit. In the PWM codes, a binary (logic 1/logic 0) signal is expressed by two codes having a different duty ratio.

In the following description, the code having a smaller (shorter) ratio (duration) of being a low level is referred to as a recessive code (first code), and the code having a larger (longer) ratio (duration) of being a low level is referred to as a dominant code (second code). In the present embodiment, the recessive code corresponds to logic 1 and the dominant code corresponds to logic 0. In the transmission codes, the boundary at which the signal level turns from high to low is also referred to as a boundary edge (i.e., a boundary pattern or boundary information), and the edge at which the signal level turns from low to high is also referred to as an intermediate edge.

In the embodiment, the term "boundary edge" is a falling edge showing a boundary periodically appearing between codes, while the term "intermediate" is a rising edge appearing in each code. In addition, the term "boundary pattern" indicates appearance of a trailing edge between codes.

Specifically, in the recessive code, ⅓ of the period of one bit is set to a low level and ⅔ thereof is set to a high level. In the dominant code, ⅔ of the period of one bit is set to a low level and ⅓ thereof is set to a high level. When the recessive code collides with the dominant code on the transmission line 5, the dominant code is ensured to win the arbitration.

When the recessive code continues in the transmission line 5 for a period corresponding to tolerable bits (11 bits in the present embodiment) or more, the period is referred to as an IFS (inter frame space). The state where the IFS is being detected is referred to as an idle state. In the in-vehicle communication system 1, the nodes 3 are regulated such that they can perform transmission when the transmission line 5 is in the idle state. Also, the in-vehicle system 1 uses access control based on CSMA/CA (carrier sense multiple access with collision avoidance). Under the access control based on CSMA/CA, after starting transmission, the node 3 that has lost the arbitration immediately stops transmission and only the node 3 that has won the arbitration continues transmission.

Figure 2B:
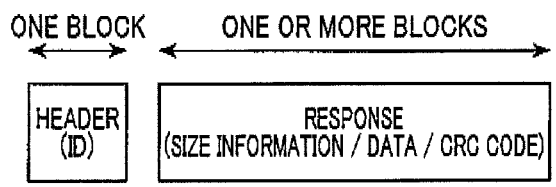
FIG. 2B is an explanatory diagram illustrating a configuration of a frame that is transmitted/received via the transmission line, according to the embodiment.

FIG. 2B is an explanatory diagram illustrating a configuration of a frame that is transmitted/received via the transmission line 5. As shown in FIG. 2B, the frame used for the communication between the nodes 3 includes a header for specifying data which is allowed to be transmitted, and a variable-length response for transmitting the data specified by the header.

The header includes an identifier (ID) of the data allowed to be transmitted. The header is set up in accordance with the value of the ID so as to survive the bus arbitration. On the other hand, the response at least includes, other than the data mentioned above, size information that indicates the size of the data (response) and a CRC (cyclic redundancy check) code for checking the presence/absence of an error.

<Nodes>

The nodes 3 include a node that supplies clocks to other nodes via the transmission line 5 (the wiper ECU here) and nodes that perform communication synchronizing with the clocks supplied via the transmission line 5. Hereinafter, the former is also referred to as a clock master 3a and the latter are also referred to as normal nodes 3b. Although partially different from one another, the clock master 3a has substantially the same configuration as that of each normal node 3b. Therefore, the following description will be focused on the common configuration, and the differences in the configuration will be supplementarily described as necessary.

Figure 3:
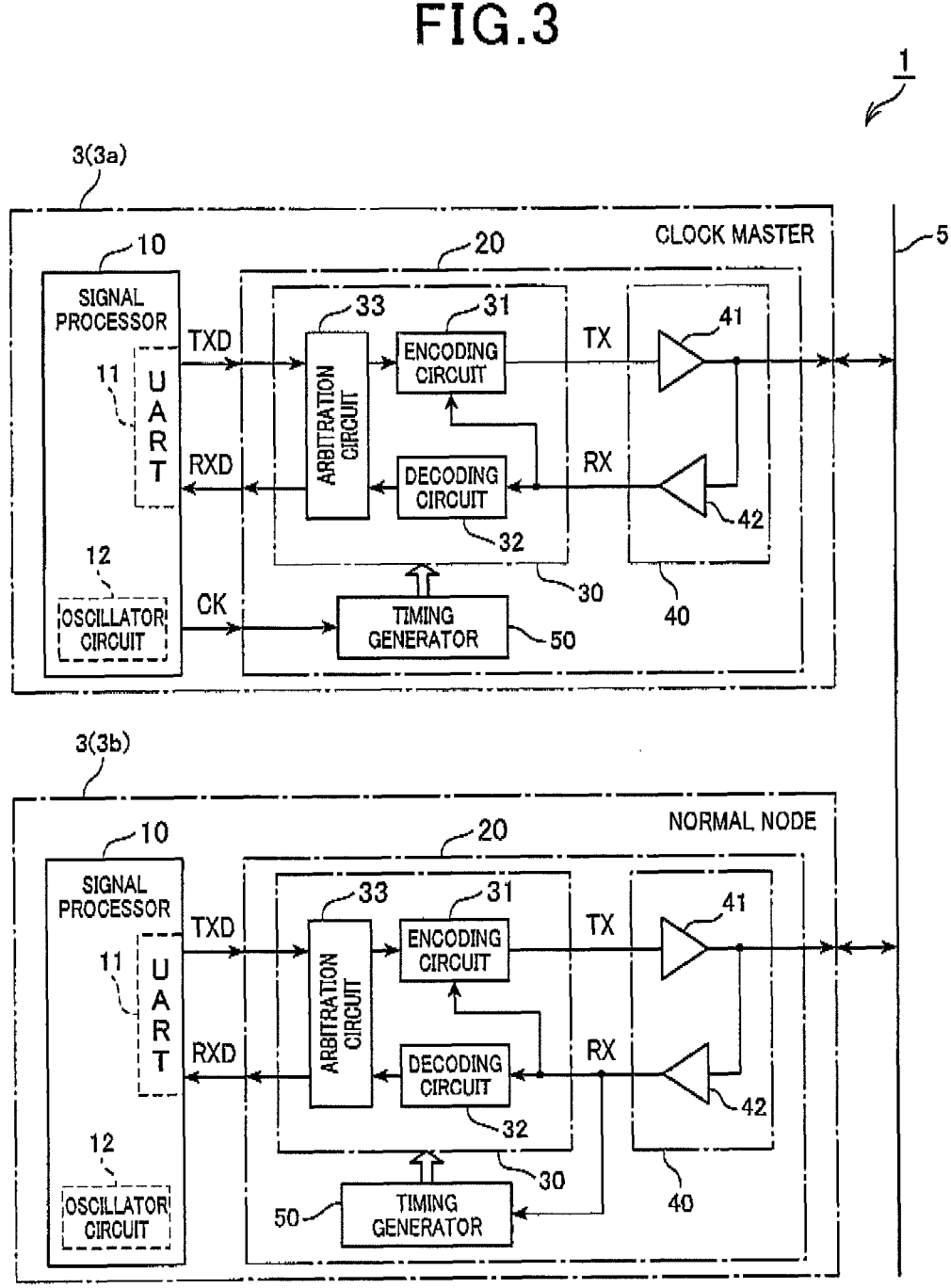
FIG. 3 is a block diagram illustrating configurations of nodes, according to the embodiment.

FIG. 3 is a block diagram illustrating the configurations of the nodes 3. As shown in FIG. 3, each node 3 includes a signal processor 10 and a transceiver 20. The signal processor 10 performs various processes allocated to the own node 3 on the basis of the information or the like acquired through communication with other nodes 3 via the transmission line 5. The transceiver 20 receives transmitted data TXD in NRZ (non-return-to-zero) codes from the signal processor 10, encodes the transmitted data TXD into transmitted data TX in PWM codes, and outputs the encoded transmitted data TX to the transmission line 5. The transceiver 20 acquires received data RX in PWM codes via the transmission line 5, decodes the received data RX into received data RXD in NRZ codes, and supplies the decoded received data RXD to the signal processor 10.

<Signal Processor>

The signal processor 10 is mainly configured by a well-known microcomputer that includes a CPU, ROM, RAM and IO port. The signal processor 10 also includes a UART (universal asynchronous receiver transmitter) 11 that realizes start-stop synchronization (asynchronous) serial communication, and an oscillator circuit 12 that generates operation clocks for operating the signal processor 10.

Figure 2C:
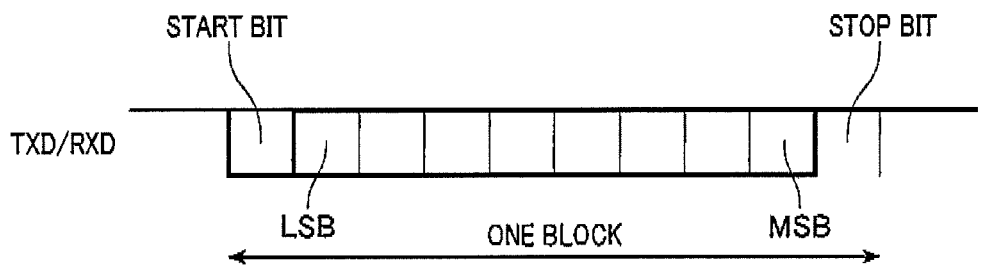
FIG. 2C is an explanatory diagram illustrating a configuration of a frame transmitted/received between a UART and a transceiver, according to the embodiment.

FIG. 2C is an explanatory diagram illustrating a configuration of a frame transmitted/received between the UART 11 and the transceiver 20. The UART 11 performs transmission/reception on the basis of a ten-bit data block as a unit. As shown in FIG. 2C, the ten-bit data block is composed of one start bit (low level) that indicates the start of the data one stop bit (high level) that indicates the end of the data, and eight data bits sandwiched between the start bit and the stop bit. The eight data bits that configure a principal part of the data block are set up such that an LSB (least significant bit) is located at the start and an MSB (most significant bit) is located at the end.

The header of the frame mentioned above (see FIG. 2B) is composed of a single data block in which, excepting the start bit and the stop bit, seven bits among the eight data bits are used as the ID and the remaining one bit is used as a parity bit. The response of the frame is composed of one or more data blocks, with the size information being set in the first data block.

In the clock master 3a, in particular, the oscillator circuit 12 is configured to generate internal clocks CK in addition to the operation clocks mentioned above. The internal clocks CK are set up so as to have the same communication speed (e.g., 20 Kbps) as that of the UART 11, and are supplied to the transceiver 20.

<Transceiver>

Referring to FIG. 3 again, the transceiver 20 includes a digital processor 30, an analog processor 40 and a timing generator 50. The digital processor 30 includes an encoding circuit 31 that encodes the transmitted data TXD, a decoding circuit 32 that decodes the received data RX, and an arbitration circuit 33 that detects collision between data on a bit basis. The analog processor 40 includes a transmission buffer 41 that outputs the transmitted data TX encoded in the digital processor 30 to the transmission line 5, and a reception buffer 42 that acquires data from the transmission line 5. The timing generator 50 generates various timing signals necessary for the operation of the digital processor 30.

<Timing Generator>

The timing generator 50 includes a simplified oscillator circuit which is composed such as of a ring oscillator. The ring oscillator is configured by connecting a plurality of inverters into a ring shape. The timing generator 50 frequency-divides a count clock, which has been generated by the oscillator circuit, to generate the various timing signals in synchronization with a reference clock (the internal clock CK in the clock master 3a, which is supplied from the signal processor 10, or the received data RX in each of the normal nodes 3b, which is acquired from the transmission line 5 via the reception buffer 42).

<Digital Processor>

In the digital processor 30, the encoding circuit 31 functions differently between the clock master 3a and each of the normal nodes 3b.

In the encoding circuit 31 of the clock master 3a, the transmitted data TXD (NRZ code) supplied from the signal processor 10 and having "logic 1" is encoded into a recessive code, and the transmitted data TXD having "logic 0" is encoded into a dominant code. The signals encoded in this way are supplied to the transmission buffer 41 as the transmitted data TX.

The encoding circuit 31 of the clock master 3a is configured such that the input will have "logic 1" when there is no supply of the transmitted data TXD from the signal processor 10. Specifically, when the signal processor 10 performs no transmission, the encoding circuit 31 of the clock master 3a is ensured to continue outputting the recessive codes as clocks, for supply to other nodes.

Figure 4:
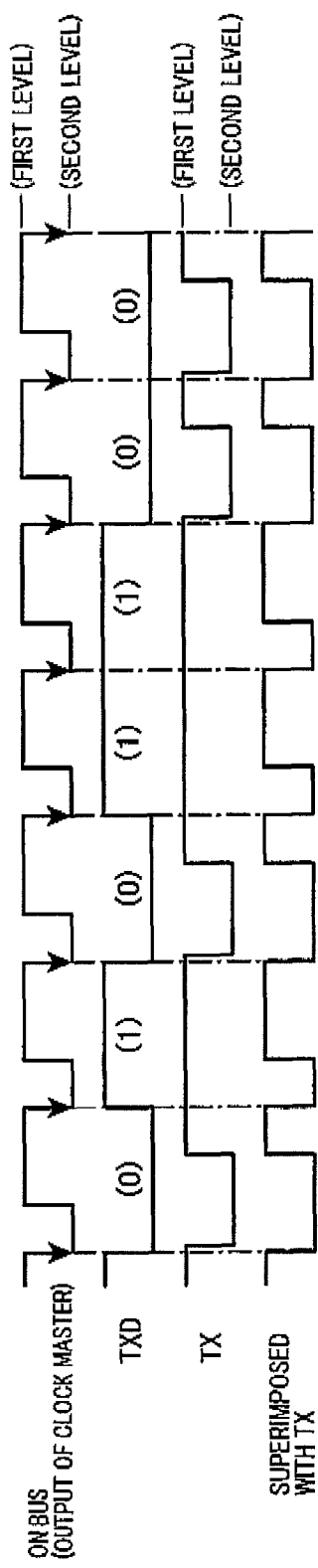
FIG. 4 is a timing diagram illustrating operation of an encoding circuit, according to the embodiment.

FIG. 4 is a timing diagram illustrating the operation of the encoding circuit 31 of the normal node 3b. As shown in FIG. 4, in the encoding circuit 31 of each normal node 3b, when the transmitted data TXD supplied from the signal processor 10 has "logic 1", a signal that exhibits the first level throughout the period of one bit is supplied to the transmission buffer 41 as the encoded transmitted data TX. Also, when the transmitted data TXD has "logic 0", a signal that turns to the second level upon detection of the rising edge of the received data RX and turns to the first level at the timing of elapsing the duration of the low level in the dominant code, is supplied to the transmission buffer 41 as the encoded transmitted data TX.

The encoded transmitted data TX is superimposed over the recessive codes on the transmission line 5, which are outputted from the clock master 3a. Then, in a period corresponding to "logic 1" of the transmitted data TXD, the recessive code is transmitted as it is via the transmission line 5, and in a period corresponding to "logic 0" of the transmitted data TXD, the data is rewritten into a dominant code for transmission via the transmission line 5.

Referring to FIG. 3 again, the decoding circuit 32 decodes the received data RX (PWM codes) received by the reception buffer 42 into NRZ codes, and supplies the decoded received data RXD to the signal processor 10. Specifically, the decoding circuit 32 measures the duration of the low level in the received data RX, using a boundary edge as a starting point. If the result of the measurement is equal to or larger than a predetermined decoding threshold Tth, the received data RX is decoded as "logic 0", and if the result of the measurement is less than the threshold, the received data RX is decoded as "logic 1".

The arbitration circuit 33 compares the transmitted data TXD with the received data RXD on a bit basis. If the signal levels do not coincide with each other, the arbitration circuit 33 stops supply of the transmitted data TXD to the encoding circuit 31.

<Decoding Circuit>

Figure 5:
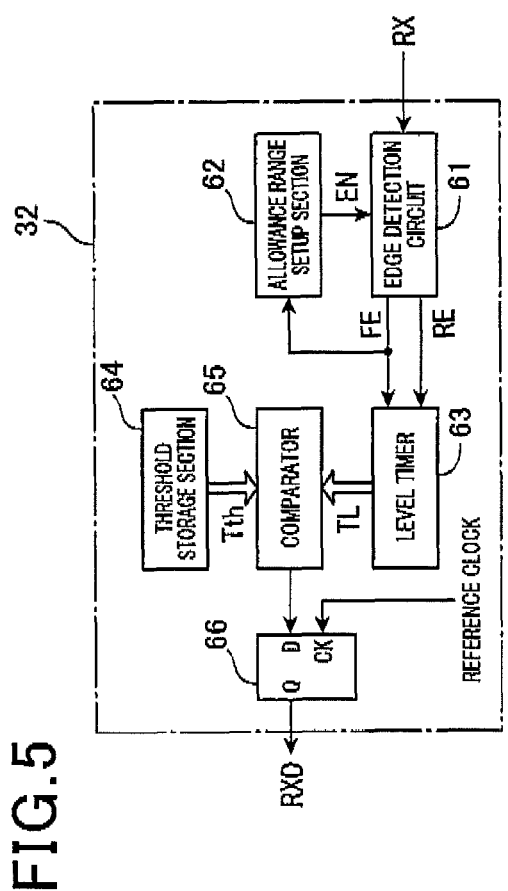
FIG. 5 is a block diagram illustrating a configuration of a decoding circuit, according to the embodiment.

FIG. 5 is a block diagram illustrating a configuration of the decoding circuit 32. As shown in FIG. 5, the decoding circuit 32 includes an edge detection circuit 61, an allowance range setup section 62 and a level timer 63. The edge detection circuit 61 detects a boundary edge and an intermediate edge in the received data RX. The allowance range setup section 62 generates enable signals EN for enabling the edge detection circuit 61 to detect a boundary edge during an allowance range that is set up on the basis of a boundary edge detection signal FE that expresses the timing of detecting a boundary edge. The level timer 63 counts time that corresponds to a time width from the point of detecting a boundary edge to the point of detecting an intermediate edge, i.e. a low-level width of a PWM code that configures the received data RX, on the basis of the boundary edge detection signal FE and an intermediate edge detection signal RE that expresses the timing of detecting an intermediate edge.

The decoding circuit 32 also includes a threshold storage section 64, a comparator 65 and a latch circuit 66. The threshold storage section 64 stores the decoding threshold Tth. The comparator 65 compares the time count, that is, a level count TL, derived from the level timer 63, with the decoding threshold Tth stored in the threshold storage section 64. The latch circuit 66 latches the output of the comparator 65 at the timing of the bit boundary of the reference clock and outputs the latched signal as decoded received data RXD.

If the level count TL is smaller than the decoding threshold Tth, the comparator 65 determines the PWM code as being the first code (recessive code), and if the level count TL is equal to or larger than the decoding threshold Tth, the comparator 65 determines the PWM code as being the second code (dominant code). Then, the comparator 65 is ensured to output binary data (i.e., binary coded signals) that has a value corresponding to the result of the determination ("logic 1" in the case of the first code/"logic 0" in the case of the second code).

In an embodiment, the process performing means is a decoding circuit to decode the signal received through the transmission line.

<Allowance Range Setup Section>

Figure 6:
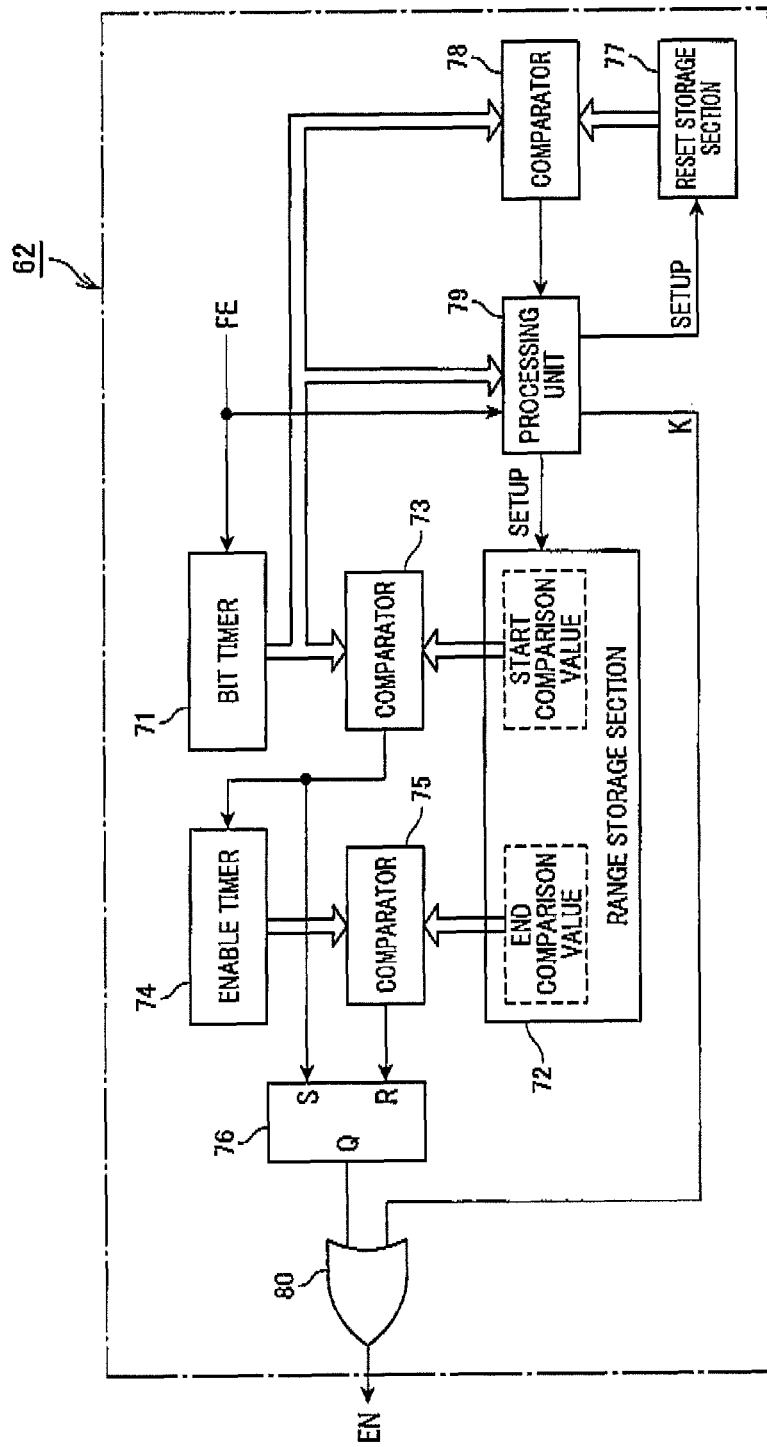
FIG. 6 is a block diagram of a specific configuration of an allowance range setup section, according to the embodiment.

FIG. 6 is a block diagram of a specific configuration of the allowance range setup section 62. As shown in FIG. 6, the allowance range setup section 62 includes a bit timer 71, a range storage section 72 and a comparator 73. The bit timer 71 counts time that corresponds to the cycle of the boundary edge (boundary edge cycle) on the basis of the boundary edge detection signals FE. The range storage section 72 stores a start comparison value and an end comparison value. The start comparison value is a count corresponding to the period from the point of detecting a boundary edge to the point of starting the allowance range. The end comparison value is a count corresponding to the duration of the allowance range. The comparator 73 outputs a start timing signal when the time count derived from the bit timer 71 coincides with the start comparison value stored in the range storage section 72.

The allowance range setup section 62 also includes an enable timer 74, a comparator 75 and an SR flip-flop circuit 76. The enable timer 74 counts the elapsed time from when the start timing signal is inputted. The comparator 75 outputs an end timing signal when the time count of the enable timer 74 coincides with the end comparison value stored in the range storage section 72. The SR flip-flop circuit 76 is applied with the start timing signal in response to a set input, and applied with the end timing signal in response to a reset input.

The allowance range setup section 62 further includes a reset storage section 77, a comparator 78 functioning as determination means, a processing unit 79, and an OR circuit 80. The reset storage section 77 stores a reset comparison value that is set up in accordance with the time count of one-bit width derived from the bit timer 71. The comparator 78 outputs a reset request signal when the time count derived from the bit timer 71 coincides with the reset comparison value. The processing unit 79 acquires the time count (boundary edge cycle) from the bit timer 71 every time the boundary edge detection signal FE is inputted. Then, the processing unit 79 generates a start comparison value, a end comparison value and a reset comparison value on the basis of the acquired time count to thereby update the contents of the range storage section 72 and the reset storage section 77 at a predetermined timing. At the same time, when a reset request signal is inputted from the comparator 78, the processing unit 79 outputs a forced enable signal K. The OR circuit 80 calculates a logical sum of the output of the SR flip-flop circuit 76 and the output of the forced enable signal K and outputs the logical sum as an enable signal EN.

The timing signals for operating the elements of the digital processor 30 are supplied from the timing generator 50, the timing signals including the count clocks for operating the level timer 63, the bit timer 71 and the enable timer 74.

The allowance range setup section 62 configured as described above outputs the enable signal EN when the forced enable signal K is at a low level, after detection of a boundary edge. The enable signal EN becomes high after lapse of the time expressed by the start comparison value and then becomes low after lapse of the time expressed by the end comparison value. Further, the allowance range setup section 62 outputs a high-level enable signal EN when the forced enable signal K is at a high level. In this case, the entire range becomes an allowance range.

<Processing Unit>

Figure 7:
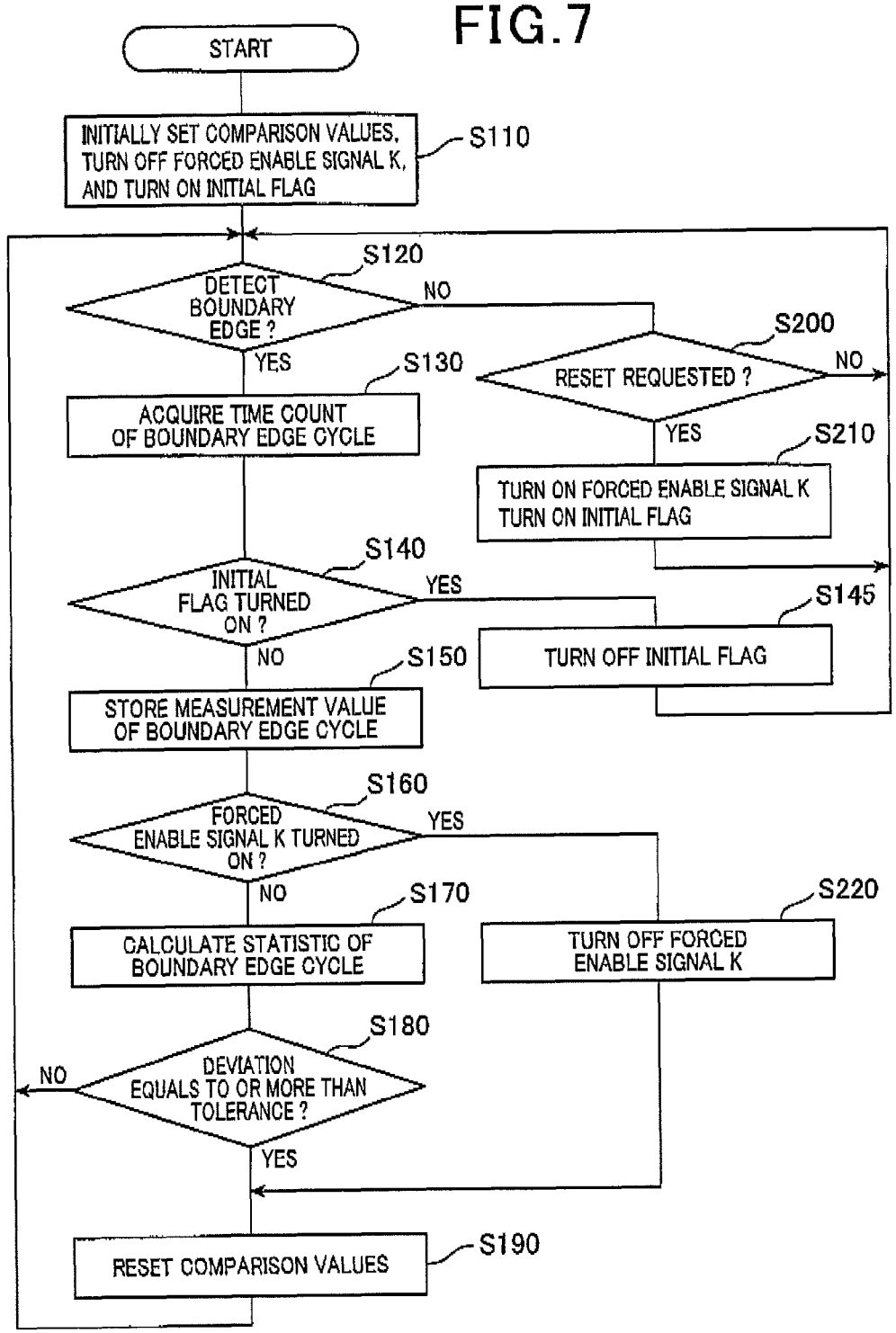
FIG. 7 is a flow diagram illustrating a process performed by a processing unit, according to the embodiment.

Referring to the flow diagram shown in FIG. 7, hereinafter is described a process performed by the processing unit 79.

The processing unit 79 may be configured by a microcomputer, or may be configured by combining logic circuits without using a microcomputer.

The processing unit 79 starts the process with the start of power supply to the digital processor 30.

First, the processing unit 79 performs initialization processing (step S110). In the initialization processing, the processing unit 79 sets up initial values of the start comparison value, the end comparison value and the reset comparison value in the range storage section 72 and the reset storage section 77. Also, the processing unit 79 turns off the forced enable signal K (sets the forced enable signal K to a low level) and turns on an initial flag prepared in advance.

The initial values of start comparison value, the end comparison value and the reset comparison value are set on the basis of a reference value. The reference value corresponds to the count of a one-bit width with the count clocks, the one-bit width being determined by the communication speed in the transmission line 5. In the present embodiment, the start comparison value is obtained by multiplying the reference value with 0.9, the end comparison in value is obtained by multiplying the reference value with 1.1 and subtracting the start comparison value from the multiplied value, and the reset comparison value is obtained by multiplying the reference value with 3.

Then, the processing unit 79 determines whether or not a boundary edge has been detected by the edge detection circuit 61 (step S120). If a boundary edge has been detected, the processing unit 79 acquires the time count from the bit timer 71 (step S130), and determines whether or not the initial flag has been turned on (step S140).

If the initial flag has been turned on, the processing unit 79 turns off the initial flag (step S145), and then, control returns to step S120. If the initial flag has been turned off, the processing unit 79 stores the time count in a predetermined storage region, as a measurement value of a boundary edge cycle (i.e., time width of one bit) (step S150).

Then, the processing unit 79 determines whether or not the forced enable signal K has been turned on (step S160). If the forced enable signal K has not been turned on (has been turned off), the processing unit 79 statistically processes the measurement values retained in the predetermined storage region to thereby calculate a statistic of the boundary edge cycles (e.g., average of the boundary edge cycles over a fixed period in the past) (step S170).

The processing unit 79 then determines whether or not the calculated statistic is deviated from the reference value by a predetermined tolerance or more, the reference value having been used in calculating the currently set start comparison value, end comparison value and reset comparison value (step S180). If the deviation is less than the tolerance, control returns to step S120.

On the other hand, if the deviation is equal to or larger than the tolerance, the processing unit 79 sets the statistic as a reference value. Further, similar to step S110, the processing unit 79 calculates a start comparison value, an end comparison value and a reset comparison value on the basis of this reference value. Depending on the calculated comparison values, the processing unit 79 resets the contents of the range storage section 72 and the reset storage section 77 (step S190). Then, control returns to step S120.

If it has been determined, at the previous step S120, that no boundary edge has been detected, the processing unit 79 determines whether or not a reset request has been inputted from the comparator 78 (step S200). If no reset request has been inputted, control returns to step S120. On the other hand, if a reset request has been inputted, the processing unit 79 turns on the forced enable signal K and, at the same time, turns on the initial flag (step S210). Then, control returns to step S120.

If it has been determined, at the previous step S160, that the forced enable signal K has been turned on, the processing unit 79 turns off the forced enable signal K (step S220). Then, control proceeds to step S190. In this case, at step S190, the processing unit 79 calculates the comparison values using, as a reference value, the measurement value of the boundary edge cycle solely stored at step S150, instead of using the statistic calculated at step S170.

In the embodiment, the steps S150-S190 functionally performed by the processing unit 79 provide variable setting means for variably setting the duration of the allowance range according to the detected period of the boundary edge. Moreover, the steps S200-S220 functionally performed by the processing unit 79 and the reset storage section 77 provide reset means for resetting the allowance range and forcibly allowing detection of the boundary edge only during a period of time lasting until the next duration of the boundary pattern is detected.

<Advantages>

Figure 8:
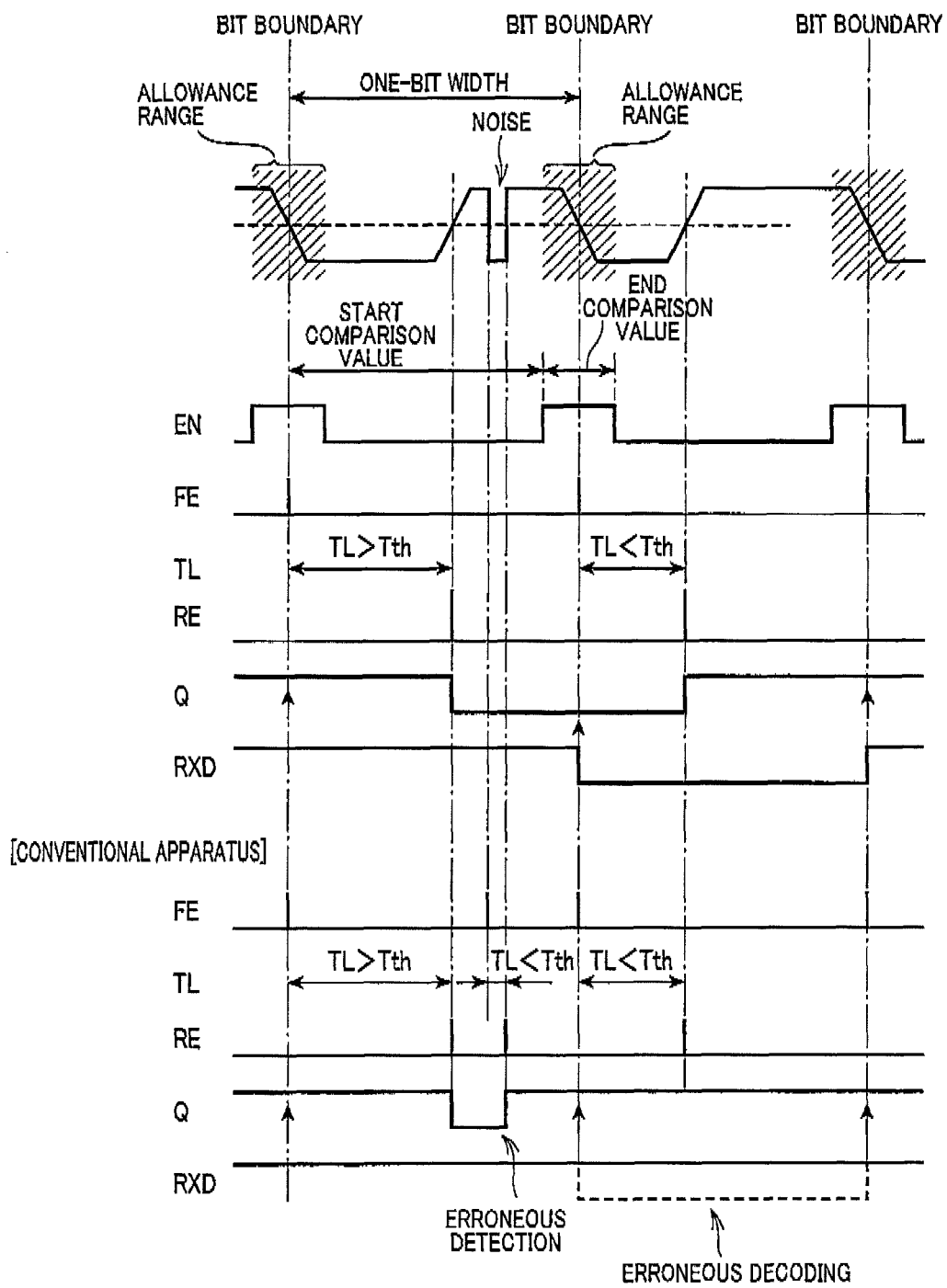
FIG. 8 is a timing diagram illustrating operation of the allowance range setup section, according to the embodiment.

FIG. 8 is a timing diagram illustrating operation of the allowance range setup section 62. As described above and as shown in FIG. 8, in the in-vehicle communication system 1, upon detection of a bit boundary (boundary edge), an allowance range is set up. The allowance range is a period from the point at which the time that corresponds to the start comparison value lapses from the timing of the detection, up to a point at which the further time that corresponds to the end comparison value lapses. Thus, it is ensured that a falling edge that occurs outside the allowance range will not be recognized as a bit boundary.

Specifically, based on the detected bit boundary, the point at which the time that corresponds to a reference value has elapsed is estimated to be the timing when the subsequent bit boundary appears. A predetermined period before or after the timing (period that corresponds to ±10% of the reference value in the present embodiment) is set up as an allowance range.

Accordingly, in the event that a falling edge has appeared due to the impact of noises, the falling edge, unless it occurs in the allowance range, would not be erroneously detected to be a boundary edge. Thus, PWM codes can be accurately decoded.

As will be understood from the lower part of the timing diagram shown in FIG. 8, erroneous decoding can occur in an apparatus based on conventional art, in which the timing of detecting a falling edge is not limited. Specifically, such an apparatus based on conventional art recognizes a falling edge due to the impact of noise to be a boundary edge and recognizes a rising edge thereafter to be an intermediate edge. Accordingly, the apparatus erroneously recognizes that a recessive code (logic 1) whose low-level width is shorter than the decoding threshold Tth has been received, resulting in erroneous decoding (as indicated by the dotted line in RXD in FIG. 8). In this regard, the in-vehicle communication system 1 is able to minimize the occurrence of such erroneous decoding.

Further, according to the in-vehicle communication system 1, the measurement values that are the time counts of boundary edge cycles are statistically processed to obtain a statistic of the boundary edge cycles. If the deviation of the statistic from the reference value exceeds the tolerance, the comparison values are ensured to be reset.

Accordingly, in the event that a clock cycle varies for some reason, as far as the variation occurs in the allowance range, the setting of the allowance range is automatically changed, following the variation. Thus, the allowance range is not required to be reset by hand, and time and effort that would be involved in the maintenance can be saved.

In addition, according to the in-vehicle communication system 1, when the time count of the boundary edge cycle has reached the reset comparison value, the individual comparison values are ensured to be reset. At the same time, the individual comparison values are ensured to be set on the basis of the boundary cycle measured by temporarily removing the allowance range. This can cope with the drastic change of the clock cycle to an extent of exceeding the allowance range. In this way, the communication apparatus of the present invention can enhance the reliability of the in-vehicle communication system 1. Further, the communication apparatus of the present invention can be used in various systems having a transmission line with a different communication speed, and can enhance general-purpose properties.

<Modifications>

An embodiment of the present invention has been described so far. However, the present invention is not limited to the embodiment described above, but may be implemented in various modes within a scope not departing from the spirit of the present invention.

In the embodiment described above, a low-level period in one bit of a transmission code is ⅓ in a recessive code and ⅔ in a dominant code. However, this shall not impose a limitation. For example, the low-level period may be ¼ in a recessive code and ½ in a dominant code.

In the embodiment described above, the boundary edge is used as a boundary pattern which is information indicating a boundary between codes. Alternatively, a bit pattern configured by a plurality of bits may be used as the boundary pattern.

Although the embodiment of the invention and modifications have been described above, the invention is not limited to the above described embodiment and modifications, and various modification can be made to the embodiment without departing from the principle of the invention.

What is claimed is:

1. A communication apparatus comprising:
   detecting means for detecting a boundary pattern periodically appearing between codes in a binary coded signal transmitted through a transmission line, the boundary pattern being information showing a boundary appearing between codes;
   process performing means for performing a process in synchronization with a timing of appearance of the boundary pattern detected by the detecting means; and
   range setting means for setting an allowance range which is set to include timing at which it is estimated that the next boundary pattern appears, the timing being counted from the timing currently detected by the detecting means,
   wherein the detecting means detects the timing of appearance of the boundary pattern during the allowance range set by the range setting means, and the process, performing means performs the process in synchronization with the timing of appearance of the boundary pattern detected by the detecting means during the allowance range.

2. The communication apparatus of claim 1, wherein the binary coded signal is coded by pulse modulated codes, and
   the detecting means detects the boundary pattern at an edge indicative of a bit boundary of a reference clock.

3. The communication apparatus of claim 1, wherein the process performing means is a decoding circuit to decode the signal received through the transmission line.

4. The communication apparatus of claim 1, wherein the range setting means comprises
   time counting means for counting a duration between the timings detected by the detecting means, and
   variable setting means for variably setting a duration of the allowance range according to the duration of the boundary pattern detected by counting means.

5. The communication apparatus of claim 4, wherein the range setting means comprises
   determination means for determining whether or not the counted duration reaches a comparison value which is set to be larger than the duration, and
   reset means for reset the allowance range and allowing the detecting means to detect the boundary pattern only during a period of time lasting until the next duration of the boundary pattern is detected by the detecting means.

6. The communication apparatus of claim 2, wherein the process performing means is a decoding circuit to decode the signal received through the transmission line.

7. The communication apparatus of claim 6, wherein the range setting means comprises
   time counting means for counting a duration between the timings detected by the detecting means, and
   variable setting means for variably setting a duration of the allowance range according to the duration of the boundary pattern detected by counting means.

8. The communication apparatus of claim 7, wherein the range setting means comprises
   determination means for determining whether or not the counted duration reaches a comparison value which is set to be larger than the duration, and
   reset means for reset the allowance range and allowing the detecting means to detect the boundary pattern only during a period of time lasting until the next duration of the boundary pattern is detected by the detecting means.

9. The communication apparatus of claim 3, wherein the range setting means comprises
   time counting means for counting a duration between the timings detected by the detecting means, and
   variable setting means for variably setting a duration of the allowance range according to the duration of the boundary pattern detected by counting means.

10. The communication apparatus of claim 9, wherein the range setting means comprises
   determination means for determining whether or not the counted duration reaches a comparison value which is set to be larger than the duration, and
   reset means for reset the allowance range and allowing the detecting means to detect the boundary pattern only during a period of time lasting until the next duration of the boundary pattern is detected by the detecting means.

11. A communication apparatus comprising:
   a detecting unit which detects a boundary pattern periodically appearing between codes in a binary coded signal transmitted through a transmission line, the boundary pattern being information showing a boundary appearing between codes;
   a process performing unit which performs a process in synchronization with timing of appearance of the boundary pattern detected by the detecting unit; and
   a range setting unit which sets an allowance range which is set to include a timing at which it is estimated that the next boundary pattern appears, the timing being counted from the timing currently detected by the detecting unit,
   wherein the detecting unit comprises a section which detects the timing of appearance of the boundary pattern during the allowance range set by the range setting unit, and the process performing unit performs the process in synchronization with the timing of appearance of the boundary pattern detected by the detecting unit during the allowance range.

12. The communication apparatus of claim 1, wherein the process performing means comprises a level timer which provides a time count, a comparator, a threshold storage section which stores a predetermined decoding threshold, and a latch circuit, wherein
   the comparator compares the time count from the level timer with the predetermined decoding threshold stored in the threshold storage section and generates an output value indicating whether a code in the binary coded signal is dominant or recessive,
   the latch circuit latches the output value of the comparator at the timing of a bit boundary of a reference clock and outputs a latched signal as decoded received data.

13. The communication apparatus of claim 11, wherein the process performing unit comprises a level timer which provides a time count, a comparator, a threshold storage section which stores a predetermined decoding threshold, and a latch circuit, wherein
   the comparator compares the time count from the level timer with the predetermined decoding threshold stored in the threshold storage section and generates an output value indicating whether a code in the binary coded signal is dominant or recessive,
   the latch circuit latches the output value of the comparator at the timing of a bit boundary of a reference clock and outputs a latched signal as decoded received data.

14. A communication apparatus comprising:
   an edge detection circuit, enabled by an enable signal, that detects a boundary pattern periodically appearing between codes in a binary coded signal received through a transmission line, the boundary pattern being information showing a boundary appearing between codes, the binary coded signal is coded by pulse modulated codes, and the edge detection circuit detects the boundary pattern at an edge indicative of a bit boundary of a reference clock;
   a decoding circuit that decodes the signal received through the transmission line, and that performs a process in synchronization with a timing of appearance of the boundary pattern detected by the edge detection circuit; and
   an allowance range setup section that sets an allowance range to include timing at which it is estimated that the next boundary pattern appears, the timing being counted from the timing currently detected by the edge detection circuit, the allowance range setup section includes
      a timer that counts a duration between the timings detected by the edge detection circuit;
      at least one logic processing circuit or a processor that
         variably sets a duration of the allowance range according to the duration of the boundary pattern detected by the timer,
         resets the allowance range and generates the enable signal that enables the edge detection circuit to detect the boundary pattern only during a period of time lasting until the next duration of the boundary pattern is detected by the edge detection circuit, and
      a comparator that determines whether or not the counted duration reaches a comparison value which is set to be larger than the duration, and wherein the edge detection circuit detects the timing of appearance of the boundary pattern during the allowance range set by the allowance range setup section, and the decoding circuit performs the process in synchronization with the timing of appearance of the boundary pattern detected by the edge detection circuit during the allowance range.

15. The communication apparatus of claim 14, wherein the decoding circuit includes a level timer which provides a time count, a level time comparator, a threshold storage section which stores a predetermined decoding threshold, and a latch circuit, wherein
   the level time comparator compares the time count from the level timer with the predetermined decoding threshold stored in the threshold storage section and generates an output value indicating whether a code in the binary coded signal is dominant or recessive,
   the latch circuit latches the output value of the level time comparator at the timing of a bit boundary of a reference clock and outputs a latched signal as decoded received data.

* * * * *